United States Patent
Choate

(10) Patent No.: US 6,832,417 B1
(45) Date of Patent: Dec. 21, 2004

(54) SAFETY SNAP HOOK

(76) Inventor: Gary E. Choate, 4894 Van Gordon St., Suite 311, Wheatridge, CO (US) 80033

( * ) Notice: Subject to any disclaimer, the term of this patent is extended or adjusted under 35 U.S.C. 154(b) by 0 days.

(21) Appl. No.: 10/264,791

(22) Filed: Oct. 4, 2002

(51) Int. Cl.[7] ............................ A44B 13/02; B66C 1/36; F16B 45/02

(52) U.S. Cl. .................... 24/600.1; 24/599.5; 24/599.6; 24/600.9; 24/601.1; 24/601.5; 294/82.19; 294/82.2

(58) Field of Search ............................ 24/600.1, 600.9, 24/601.1, 601.5, 592.11, 599.5, 599.6, 599.1; 294/82.2

(56) References Cited

U.S. PATENT DOCUMENTS

| | | | | |
|---|---|---|---|---|
| 1,525,292 A | * | 2/1925 | Greve | 294/82.19 |
| 1,626,866 A | * | 5/1927 | Neilson | 294/82.2 |
| 1,753,326 A | * | 4/1930 | Xingling | 294/82.2 |
| 1,879,168 A | * | 9/1932 | Freysinger | 24/600.1 |
| 4,122,585 A | * | 10/1978 | Sharp et al. | 294/82.2 |
| 4,434,536 A | | 3/1984 | Schmidt et al. | |
| 4,977,647 A | | 12/1990 | Casebolt | |
| 5,694,668 A | | 12/1997 | Rohlf | |
| 5,735,025 A | * | 4/1998 | Bailey | 24/600.1 |
| 6,161,264 A | * | 12/2000 | Choate | 24/599.5 |

* cited by examiner

*Primary Examiner*—Victor Sakran
(74) *Attorney, Agent, or Firm*—Ramon L. Pizarro; Edwin H. Crabtree

(57) ABSTRACT

A safety hook that includes a body having a hook portion and a shank portion, a gate that is pivotally mounted from a gate pivot point on the shank portion, and a locking element that is pivotally supported from the shank. The safety hook also includes a peninsular portion that extends between the locking element and the and the heel portion of the gate, and a spring, the spring being mounted between and against the locking element and the locking element, so that to release the gate the user simply rotates the locking element away from the peninsular portion and then rotates the closure portion in, towards the mouth of the hook.

15 Claims, 4 Drawing Sheets

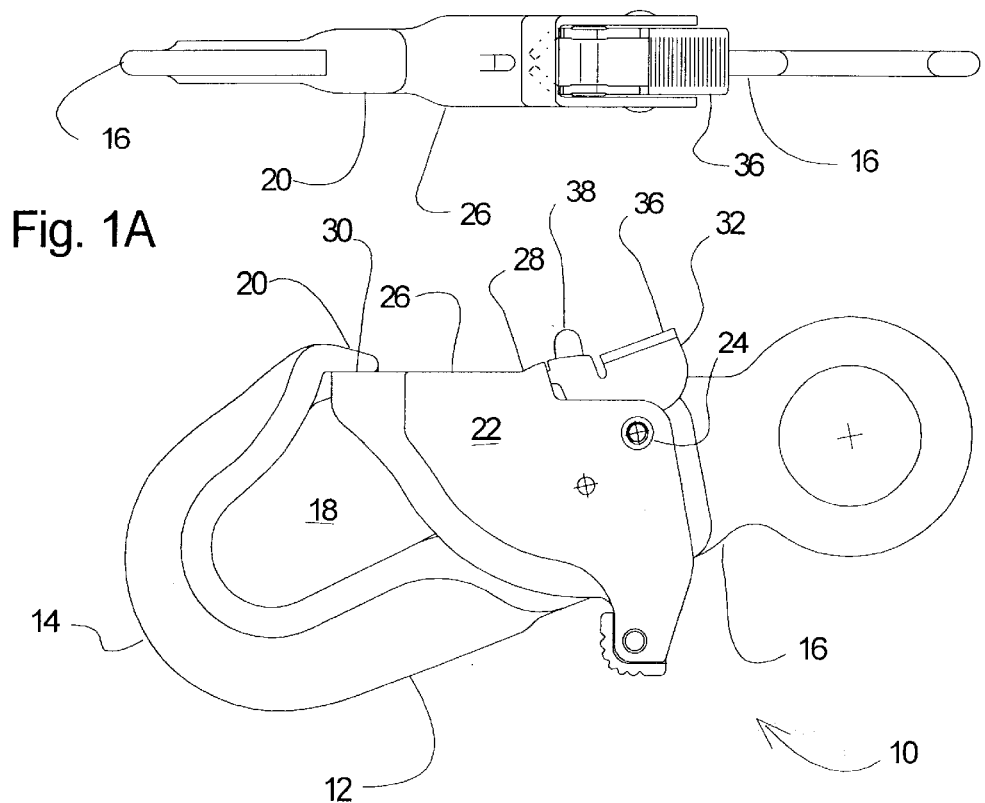
Fig. 1A
Fig. 1
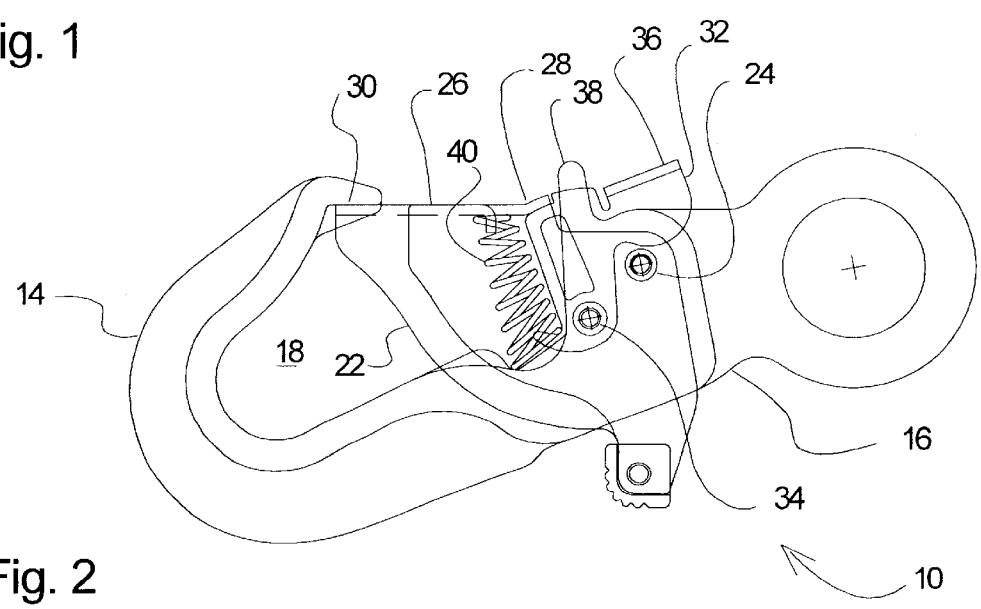
Fig. 2

SAFETY SNAP HOOK

BACKGROUND OF THE INVENTION (a) Field of the Invention

This invention generally relates to a safety hook, and more particularly to a hook for use with a safety lanyard. The hook including a gate for covering the mouth of the hook and a locking mechanism for controlling the opening of the gate.

(b) Discussion of Known Art

Safety hooks or snap hook, meaning hooks that include some sort of gate that closes the mouth of the hook in order to prevent the release of the hook have been used for various purposes. An important use of these snap hooks is in the area of worker safety, or fall protection. In this field, snap hooks are typically used for tethering an individual by way of a lanyard to a support structure.

In order to prevent the undesired release of the hook, most snap hooks include a locking mechanism that that allows the user to control when the gate can be easily opened, and thus allow the attachment or release of the hook. The operation of the locking mechanism and the manner of opening of the gate are important factors in the selection and design of a safety snap hook. For example, a snap hook that is designed to attach to rigid anchoring points may simply include a locking gate that is released by finger actuated locking mechanism. The opening of the gate to engage the anchor point is then achieved by simply sliding the mouth of the hook over the anchor point, and the rigidity of the anchor point will urge the gate to open and the engagement of the hook with the anchor point. The user then simply releases the locking mechanism to ensure that the gate is locked in the closed position, preventing undesired release of the hook.

In other applications, the user must attach the safety hook to a horizontal lifeline, a D-ring, or other support point that may move away from the user as the gate is pressed against the support point. For these applications it is particularly useful to employ safety hooks where the user must be able to release the locking mechanism and open the gate with a single hand. These types of hooks typically include a finger operated locking mechanism and a gate with a thumb-operated lever that allows the user to open the gate. Examples of these devices include U.S. Pat. No. 4,434,536 to Schmidt et al., and U.S. Pat. No. 4,977,647 to Casebolt.

An important safety concern for safety hooks is that both the locking mechanism and the gate may both be inadvertently forced during a fall, causing the gate to open. This simultaneous forcing of both components can occur as a result of twisting or turning of the hook against a D-ring, for example. Thus, it is important to ensure that both the gate and the locking mechanism cannot be easily simultaneously exposed to a force urging both components to the open position. For example, if a portion of a D-ring or section of a lanyard is pressed against the lateral extension and the tongue of the Schmidt et al. invention, it is conceivable that both elements could be moved to the open position.

Another important design concern for safety hooks, is the design of a hook that uses few number of components, while maintaining the double action or double locking features desired in safety hooks. For example, it would be advantageous to provide the double locking features of the Casebolt design, without incorporating a separate spring for lock member or locking element, and the latch member or gate.

Therefore, a review of known devices reveals that there remains a need for a simple safety snap hook that is light and can accommodate single handed activation.

SUMMARY

It has been discovered that the problems left unanswered by known art can be solved by providing a safety hook that includes:

a body having a hook portion that includes a mouth that terminates in a nose, the hook portion further having a shank portion;

a gate that is pivotally mounted from a gate pivot point on the shank portion and includes a closure portion that includes a heel portion and a toe portion, the toe portion cooperates with the nose of the hook to close off the mouth of the hook;

a locking element that is pivotally supported from a lock pivot that is positioned on the shank at a location between the gate pivot and the hook portion, the locking element having a trigger portion;

a peninsular portion extending between the locking element and the heel portion of the gate; and a spring, the spring being mounted between and against the gate and the locking element, the spring urging the toe portion of the closure portion against the nose of the hook while urging the locking element against the peninsular portion, so that to release the gate the user simply rotates the locking element away from the peninsular portion and then rotates the closure portion in, towards the mouth of the hook.

According to an example of the invention, the locking element extends below the heel of the closure, on a first side of the peninsular portion, while the trigger portion is biased by the spring against an opposite side of the peninsular portion. With this configuration, simultaneous pressure on the closure and the trigger portion will not result in the release of the gate. Similarly, sequential pressure by first pressing and releasing the trigger and then pressing against the gate will not result in the opening of the gate. Thus it will be understood that the disclosed safety snap hook provides a simple mechanism that can be operated with a single hand.

It will be understood that the disclose safety snap hook achieves the benefits of known safety hooks, while eliminating parts.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 is a side view of an example of the invention.

FIG. 1A is an end view looking towards the mouth and trigger of the view shown in FIG. 1.

FIG. 2 is a side view of an example of the invention, the components of the example being shown as transparent in order to illustrate the arrangement of the components of the example.

FIG. 2A is an end view looking towards the mouth and trigger of the view shown in FIG. 1.

Figure 3:
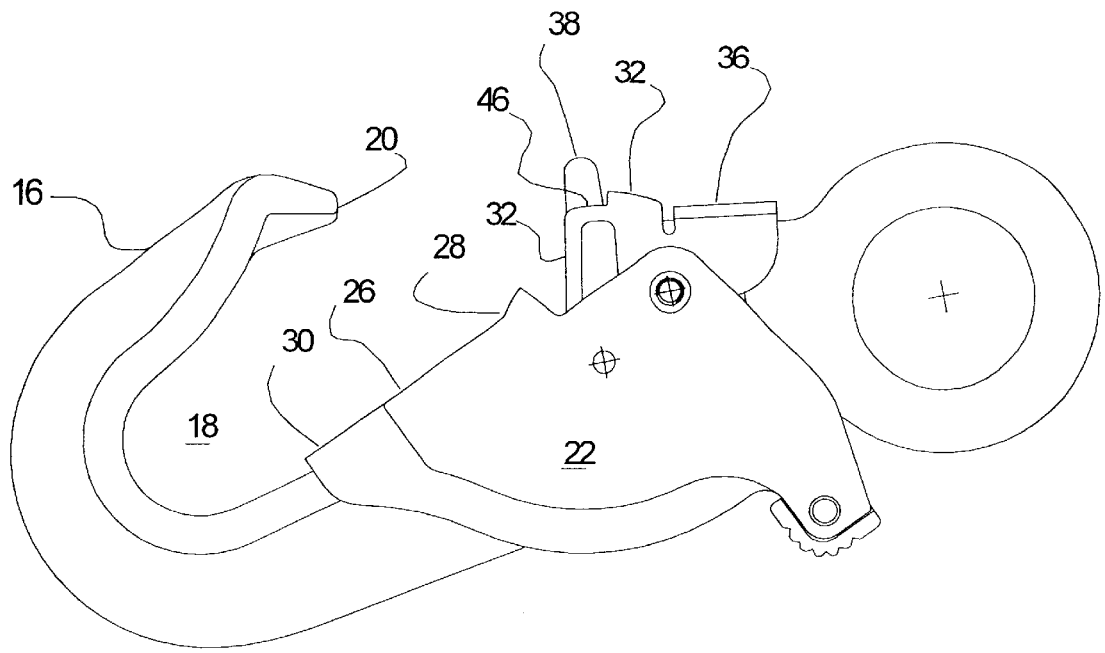
FIG. 3 illustrates the operation of the trigger and the gate of an example of the invention.
Figure 4:
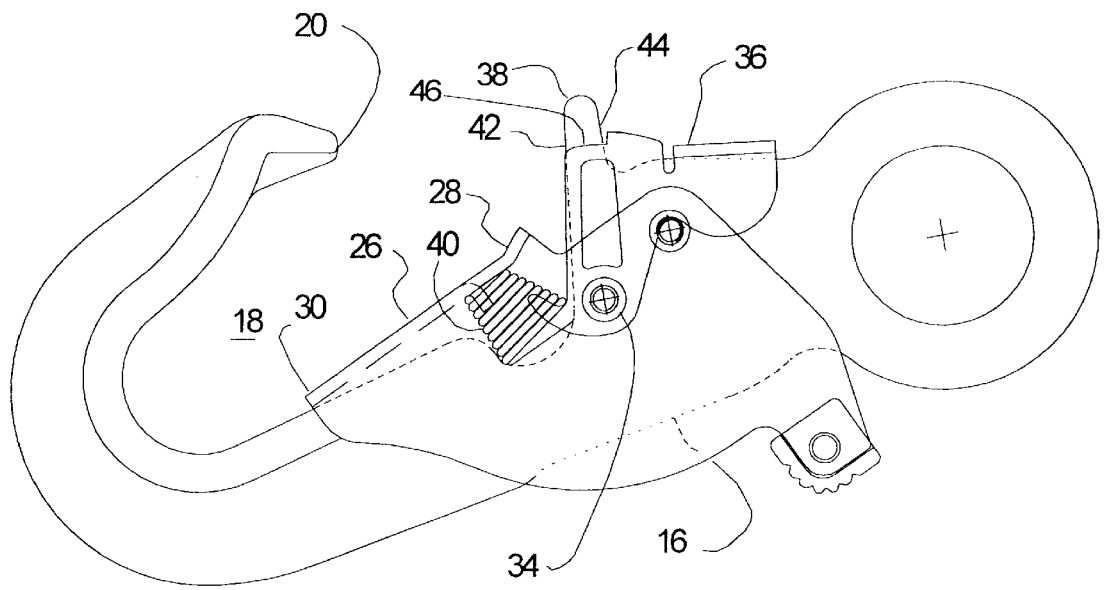

FIG. 4 includes the example shown in FIG. 3, with the components of the example being shown as transparent in order to illustrate the arrangement and cooperation of the components of the example.

Figure 5:
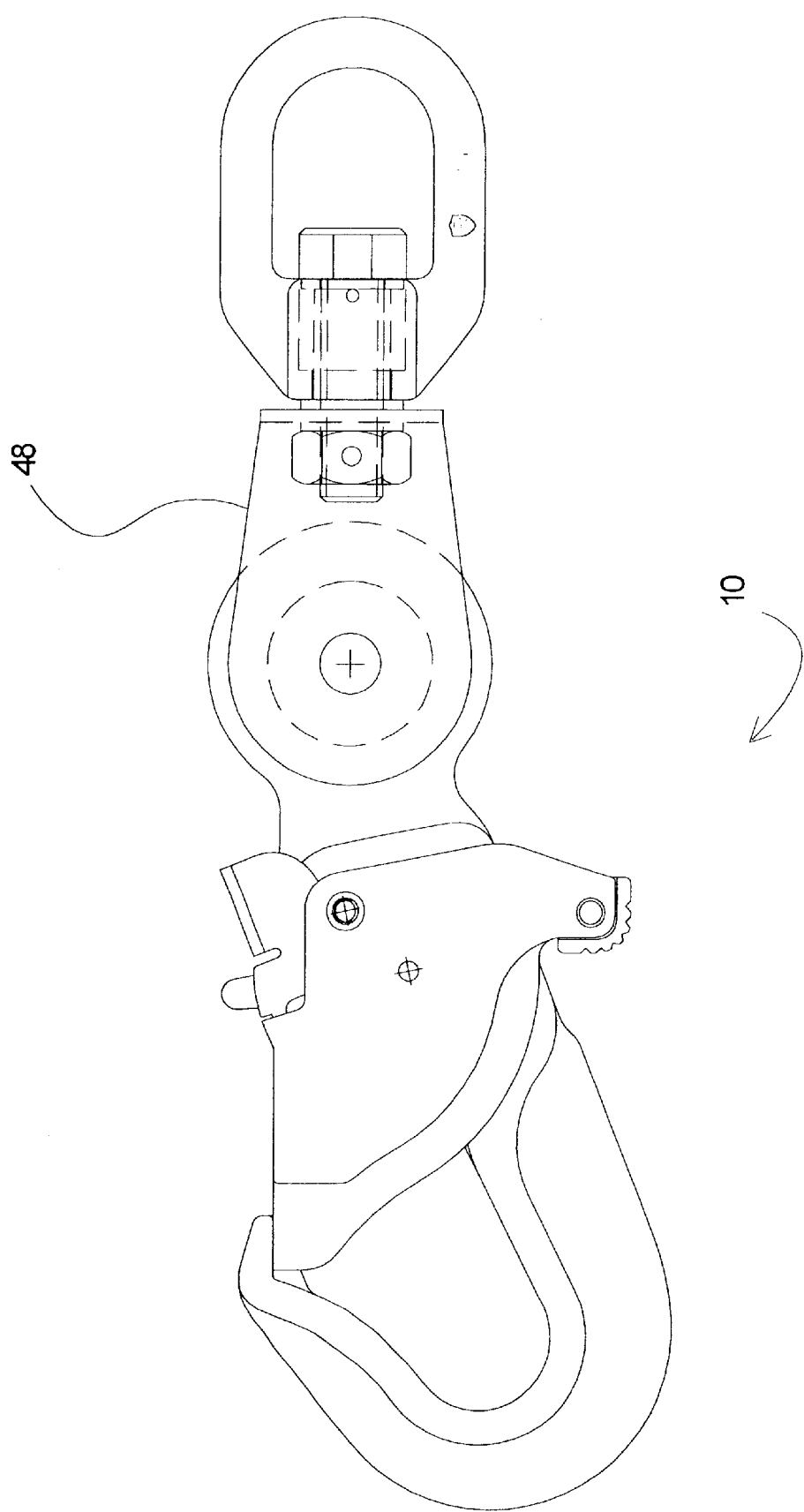

FIG. 5 illustrates a pivotable connector attached to the shank of an example of the disclosed invention.

Figure 6:
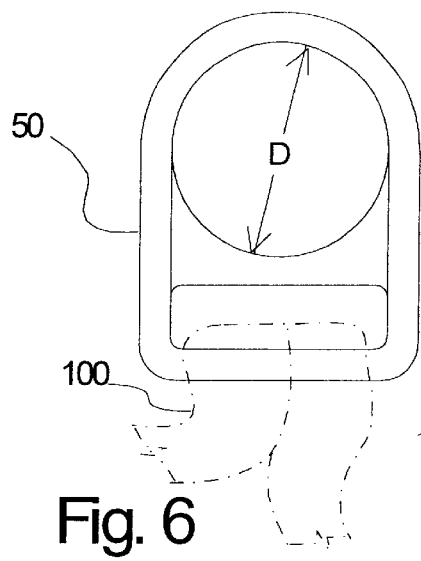

FIG. 6 illustrates a D-ring of the type often found on safety harnesses.

Figure 7:
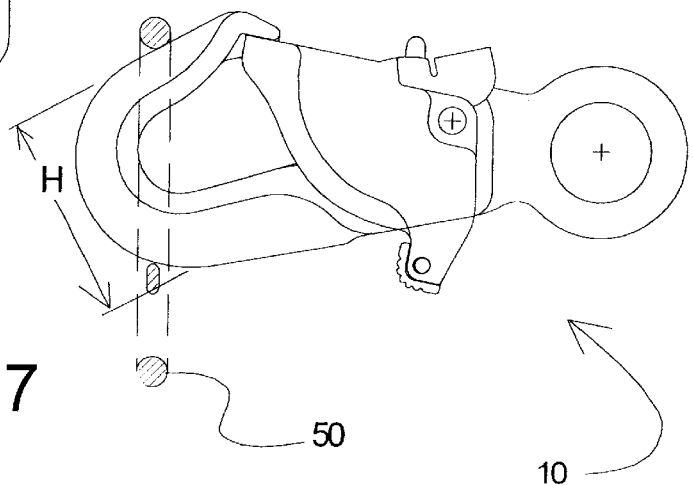

FIG. 7 illustrates the sizing of the hook portion of the disclosed invention in order to prevent false locking on a harness.

Figure 8:
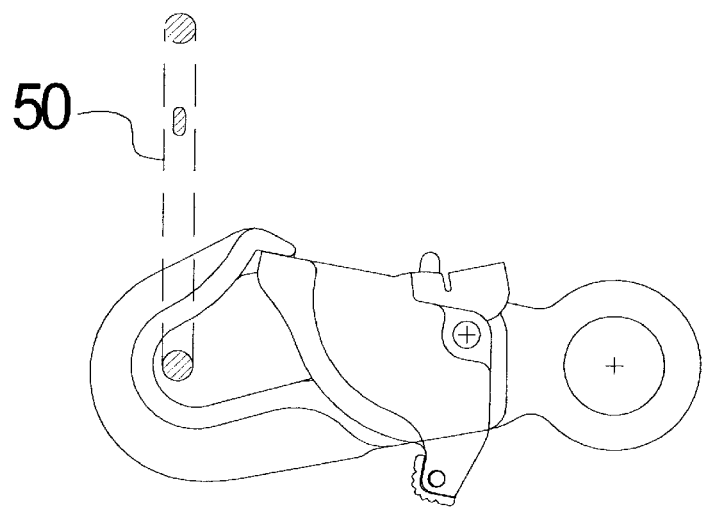

FIG. 8 illustrates the fit or cooperation of the safety snap hook and a D-ring.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Turning now to FIG. 1 where a safety hook 10 has been illustrated having a body 12 that includes a hook portion 14 and a shank portion 16. The hook portion includes a mouth 18 that terminates in a nose 20.

Pivotally mounted to the shank 16, is a gate 22. The gate 22 rotates about a gate pivot 24 point on the shank portion 16, and includes a closure portion 26. The Closure portion 26 includes a heel portion 28 and a toe portion 30. As illustrated in FIGS. 1 and 2, the toe portion 30 has been adapted for contacting the nose 20 of the hook portion 12 to close off the mouth 18 of the hook portion 12.

Referring now to FIGS. 1, 1A, 2 and 3, it will be understood that the gate 22 will cooperate with a locking element 32 that is pivotally supported from a lock pivot 34 point that is positioned on the shank 16 at a location between the gate pivot 24 and the hook portion 14. Additionally, the locking element 32 will include a trigger portion 36 that will allow a user to release or free the gate 22, and move the gate from the closed position shown in FIG. 1, to the open position shown in FIG. 3.

Also illustrated in FIGS. 3 and 4, is a peninsular portion 38 that extends from the shank 16, and between the locking element 32 and the and the heel portion 28 of the gate 22. The peninsular portion 38 separates the locking element 32 and the gate 22, and prevents the inadvertent pressing of both the gate 22 and the trigger 36 of the locking element 32. Thus, the protrusion of the peninsular portion 38, as illustrated in FIG. 1 will prevent inadvertent opening of the gate 22 by an article such as a D-ring or a rope that winds around the hook and presses against the area along the locking element and gate during a fall. Thus, the protruding peninsular portion 38 lifts the rope or other article away from the trigger 36 before progression on to the gate, and visa versa.

As illustrated in FIGS. 2 and 4, the disclosed double action hook uses a single spring 40 to bias both the gate 22 and the locking element 32 to the position illustrated in FIG. 1, where the gate is locked while closing off the mouth of the hook 12. The spring 40 is mounted from the locking element 32, near the lock pivot 34 and is compressed between the gate 22 and the locking element 32, urging the toe portion 30 of the gate 22 against the nose 20 of the hook 12. Additionally, when the gate 22 is in the closed position, illustrated in FIG. 1, the spring 40 also urges the urging heel 28 of the closure portion 26 against the peninsular portion 38, The reaction of the spring 40 on the locking element 32 also urges the trigger 36 against the peninsular portion 38.

As shown in FIGS. 2 and 4, the peninsular portion 38 includes a first side 42 and a second side 44, the second side 44 being opposite to the first side 42. Thus the spring 40 urges the urging heel 28 of the closure portion 26 against first side of the peninsular portion 38. The reaction of the spring 40 on the locking element 32 while urges the trigger 36 against the second side 44 of the peninsular portion 26.

Still further, as illustrated in FIGS. 2 and 4, it will be understood that the locking element 32 will also include a gate engagement portion 46 that cooperates with the heel 28 of the closure portion 26 to retain the gate in a locked position, illustrated in FIG. 2.

Turning now to FIG. 5 it will be understood that it is contemplated that a pivotable connector 48 may be attached to the shank 16 of the safety hook 10. The pivotable connector would allow free rotation of lanyard or similar device that is used to tether the hook to a safety harness or other devices.

According to yet another aspect of the invention, which has been illustrated in FIGS. 6–8, it is contemplated that the safety snap hook 10 as described herein cooperates with the D-ring 50 of a harness 100 to prevent inadvertent false engagement of the safety hook and the D-ring of the safety harness. The D-ring of the safety harness is typically positioned on the back of the harness, such that it will be at a location between the shoulder blades on the upper portion of the wearer's back. The problem of false engagement occurs where a snap hook is inserted into the aperture 102 in the D-ring, and because the entire body of the snap hook fits into the aperture 103, where it cannot be seen by the wearer, it is possible for the snap hook to appear that it is properly engaged with the D-ring when in fact it is not. The proportions of the known snap hooks allow the entire body of the snap hooks to enter the aperture 103. The nose of known hooks or other protrusion can temporarily catch on the D-ring, giving the wearer the impression that the hook has properly engaged the D-ring.

FIGS. 7–8 illustrate that the disclosed invention 10 has been sized to have a body that is of a size H, which is larger than the diameter D of the aperture 103, making a false connection with the D-ring impossible. Thus, another aspect of the disclosed invention is a system that uses a D-ring 50 attached to the back of a harness 100. The safety snap hook 1.0 may be attached to a lanyard, preferably next to a shock absorber on the lanyard. Thus the use of the safety snap hook 1C with the lanyard and the harness would prevent false engagement of the safety hook with the D-ring of the harness 100.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A safety hook comprising:
   a body having a hook portion that includes a mouth that terminates in a nose, the hook portion further having a shank portion;
   a gate that is pivotally mounted from a gate pivot point on the shank portion and includes a closure portion that includes a heel portion and a toe portion, the toe portion adapted for contacting the nose of the hook to close off the mouth of the hook;
   a locking element that is pivotally supported from a lock pivot that is positioned on the shank at a location between the gate pivot and the hook portion, the locking element having a trigger portion; and
   a spring that urges both the locking element and the gate towards one another, the spring being mounted between and against both the locking element and the gate, the spring urging the toe portion of the closure portion against the nose of the hook while urging the locking element against the heel portion of the locking element.

2. A safety hook according to claim 1 and further comprising peninsular portion extending from the shank and between the locking element and the heel portion of the gate, and wherein the locking element extends below the heel of the closure.

3. A safety hook according to claim 2 wherein said peninsular portion includes a first side and a second side opposite to the first side, and said spring urges the heel of the closure against the first side of the peninsular portion while urging the trigger portion is biased by the spring against the second side of the peninsular portion.

4. A safety hook according to claim 1 and further comprising a pivotable connector attached to the shank of the hook.

5. A safety hook according to claim 1 wherein said locking element further comprises a gate engagement portion that fits under the heel portion of the closure portion and prevents rotation of the gate while the trigger is biased against the peninsular portion.

6. A safety hook comprising:
   a body having a hook portion that includes a mouth that terminates in a nose, the hook portion further having a shank portion;
   a gate that is pivotally mounted from a gate pivot point on the shank portion and includes a closure portion that includes a heel portion and a toe portion, the toe portion adapted for contacting the nose of the hook to close off the mouth of the hook;
   a locking element that is pivotally supported from a lock pivot that is positioned on the shank at a location between the gate pivot and the hook portion, the locking element having a trigger portion;
   a peninsular portion extending between the locking element and the heel portion of the gate; and
   a spring, the spring being mounted between and against the locking element and the gate, the spring urging the locking element and the gate to rotate in opposite directions about the lock pivot and the gate pivot point, respectively, urging the toe portion of the closure portion against the nose of the hook while urging heel of the closure portion and the trigger of the locking element against the peninsular portion, while retaining a gate engagement portion of the locking element against the heel of the gate to retain the gate in a locked position.

7. A safety hook according to claim 6 wherein the gate engagement portion of the locking element extends next to the heel of the closure when the trigger portion is urged against the peninsular portion.

8. A safety hook according to claim 6 wherein said peninsular portion includes a first side and a second side opposite to the first side, and said spring urges the heel of the closure against the first side of the peninsular portion while urging the trigger portion is biased by the spring against the second side of the peninsular portion.

9. A safety hook according to claim 6 and further comprising a pivotable connector attached to the shank of the hook.

10. A safety hook according to claim 6 wherein said gate engagement portion that fits under the heel portion of the closure portion and prevents rotation of the gate while the trigger is biased against the second side of the peninsular portion.

11. A method for closing a double action safety hook with a single spring, the method comprising:
   providing a hook body having a hook portion that includes a mouth portion that terminates in a nose, the hook portion further having a shank portion;
   the hook further having a gate that is pivotally mounted from a gate pivot point on the shank portion and includes a closure portion that includes a heel portion and a toe portion, the toe portion adapted for contacting the nose of the hook to close off the mouth of the hook;
   a locking element that is pivotally supported from a lock pivot that is positioned on the shank at a location between the gate pivot and the hook portion, the locking element having a trigger portion;
   a peninsular portion extending between the locking element and the and the heel portion of the gate; and
   inserting a compression spring between and against the locking element and the gate so that the spring urges the locking element and the gate to rotate in opposite directions about the lock pivot and the gate pivot point, respectively, urging the toe portion of the closure portion against the nose of the hook while urging heel of the closure portion and the trigger of the locking element against the peninsular portion, while retaining a gate engagement portion of the locking element against the heel of the gate to retain the gate in a locked position.

12. A method according to claim 11 wherein the gate engagement portion of the locking element extends next to the heel of the closure when the trigger portion is urged against the peninsular portion.

13. A method according to claim 11 wherein said peninsular portion includes a first side and a second side opposite to the first side, and said spring urges the heel of the closure against the first side of the peninsular portion while urging the trigger portion is biased by the spring against the second side of the peninsular portion.

14. A method according to claim 11 and further comprising a pivotable connector attached to the shank of the hook.

15. A method according to claim 11 wherein said gate engagement portion that fits under the heel portion of the closure portion and prevents rotation of the gate while the trigger is biased against the second side of the peninsular portion.

* * * * *